(12) United States Patent
Huang et al.

(10) Patent No.: US 10,120,121 B2
(45) Date of Patent: Nov. 6, 2018

(54) DEVICE FOR TRANSPORTING LIGHT (71) Applicant: THOMSON LICENSING, Issy les Moulineaux (FR)

(72) Inventors: Wenxin Huang, Beijing (CN); Zuke Zhou, Beijing (CN); Juzhi Qin, Beijing (CN)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/533,018

(22) PCT Filed: Dec. 4, 2014

(86) PCT No.: PCT/CN2014/093056
§ 371 (c)(1),
(2) Date: Jun. 3, 2017

(87) PCT Pub. No.: WO2016/086393
PCT Pub. Date: Jun. 9, 2016

(65) Prior Publication Data
US 2017/0329076 A1    Nov. 16, 2017

(51) Int. Cl.
*F21V 8/00* (2006.01)
(52) U.S. Cl.
CPC ......... *G02B 6/0078* (2013.01); *G02B 6/0008* (2013.01); *H05K 999/99* (2013.01)
(58) Field of Classification Search
CPC .............................. G02B 6/0078; G02B 6/0008
See application file for complete search history.

(56) References Cited

U.S. PATENT DOCUMENTS

| 5,327,328 A | 7/1994 | Simms et al. |
| 7,083,315 B2 | 8/2006 | Hansler et al. |
| 7,909,482 B2 | 3/2011 | Veenstra et al. |
| 2002/0136027 A1 | 9/2002 | Hansler et al. |
| 2008/0137361 A1 | 6/2008 | Ho |

(Continued)

FOREIGN PATENT DOCUMENTS

| CN | 101201426 | 6/2008 |
| CN | 201378211 | 1/2010 |

(Continued)

OTHER PUBLICATIONS

Wild et al., "From Development to Start of Production", International Light Simulation Symposium (ILISIS) 2012, Nuremberg, Germany, Mar. 7, 2012, pp. 1-13.

*Primary Examiner* — Thomas M Sember
(74) *Attorney, Agent, or Firm* — Jeffrey M. Navon (57) ABSTRACT

Disclosed is a device for transporting light, comprising at least two light pipes and at least one connection part, the at least two light pipes and the at least one connection part are molded with same material as a single component, each connection part includes two constitution parts for connecting to two adjacent light pipes, each constitution part has a larger polygonal base, a smaller polygonal base and at least three surfaces connecting the larger polygonal base to the smaller polygonal base, two larger polygonal bases of the two constitution parts connect to the two adjacent light pipes and two smaller polygonal bases of the two constitution bases connect to each other, wherein for each constitution part, at least one surface, whose inner faces incident direction of light within its connecting light pipe, inclines towards the larger polygonal base.

9 Claims, 8 Drawing Sheets

(56) References Cited

U.S. PATENT DOCUMENTS

2008/0291668 A1 11/2008 Aylward et al.
2011/0146068 A1 6/2011 Veenstra et al.

FOREIGN PATENT DOCUMENTS

| | | |
|---|---|---|
| CN | 103036111 | 4/2013 |
| CN | 203786317 | 8/2014 |
| JP | 2011175954 | 9/2011 |

DEVICE FOR TRANSPORTING LIGHT

This application claims the benefit, under 35 U.S.C. § 365 of International Application PCT/CN2014/093056, filed Dec. 4, 2014, which was published in accordance with PCT Article 21(2) on Jun. 9, 2016, in English.

TECHNICAL FIELD

The present disclosure relates to light transport, and more particularly relates to a device for transporting light.

BACKGROUND

A waveguide is a structure that guides waves, such as electromagnetic waves or sound waves. There are different types of waveguides for each type of wave.

For optical waves, the corresponding waveguide is an optical waveguide. It is a physical structure that guides electromagnetic waves in the optical spectrum. As examples of optical waveguides, light tubes or light pipes are physical structures used for transporting or distributing natural or artificial light for the purpose of illumination.

In electronic devices, molded plastic light tubes are commonly used in the electronics industry to direct illumination from LEDs (light emitting diode) on a circuit board to indicator symbols or buttons in the front panel. These light tubes typically take on a highly complex shape, which either uses gentle curving bends as in an optic fiber or has sharp prismatic folds which reflect off the angled corners. Multiple light tubes are often molded from a single piece of plastic, permitting easy device assembly since the long thin light tubes are all parts of a single rigid component that snaps into place.

Light tube indicators make electronics cheaper to manufacture since the old way would be to mount or install a tiny lamp into a small socket directly behind the spot to be illuminated. This often requires extensive hand-labor for installation and wiring. Light tubes permit all lights to be mounted on a single flat circuit board, but the illumination can be directed up and away from the board by several inches, wherever it is required.

Some products require different color LEDs to be closely placed in certain pattern. Thus different light pipes are required for the light transfer. The ideal solution is that light pipe are isolated from each other and mounted separately to avoid light leakage and interference. But this will cause high product cost and complex production process. A common solution in the industry is to add some rectangle bars with the same material as the light pipe (or called rectangular parallelepiped) as bridge to connect all light pipes for low cost. For cost reason, the rectangular bars and the light pipes are molded together as a single component. However, the connection bridges may cause light leakage and interference between different light pipes to which they connect.

SUMMARY

According to an aspect of the present disclosure, it is provided a device for transporting light, comprising at least two light pipes and at least one connection part, the at least two light pipes and the at least one connection part are molded with same material as a single component, each connection part includes two constitution parts for connecting to two adjacent light pipes, each constitution part has a larger polygonal base, a smaller polygonal base and at least three surfaces connecting the larger polygonal base to the smaller polygonal base, two larger polygonal bases of the two constitution parts connect to the two adjacent light pipes and two smaller polygonal bases of the two constitution bases connect to each other, wherein for each constitution part, at least one surface, whose inner faces incident direction of light within its connecting light pipe (i.e. a light pipe to which the constitution part connects), inclines towards the larger polygonal base.

It is to be understood that more aspects and advantages of the disclosure will be found in the following detailed description of the present disclosure.

BRIEF DESCRIPTION OF THE DRAWINGS

The accompanying drawings, which are included to provide a further understanding of the disclosure and are incorporated in and constitute a part of this application, will be used to illustrate an embodiment of the disclosure, as explained by the description. The disclosure is not limited to the embodiment.

In the drawings.

DETAILED DESCRIPTION

The embodiment of the present disclosure will now be described in detail in conjunction with the drawings. In the following description, some detailed descriptions of known functions and configurations may be omitted for clarity and conciseness.

Figure 1:
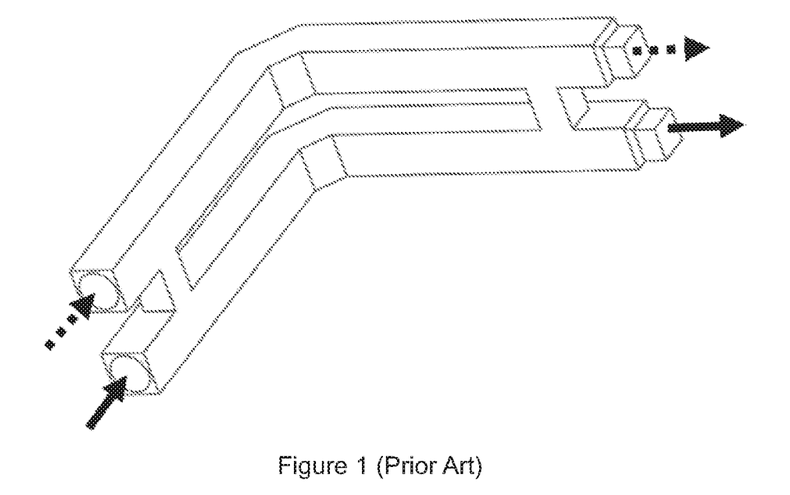
FIG. 1 is a diagram showing ideal light transfer path according to prior art.
Figure 2:
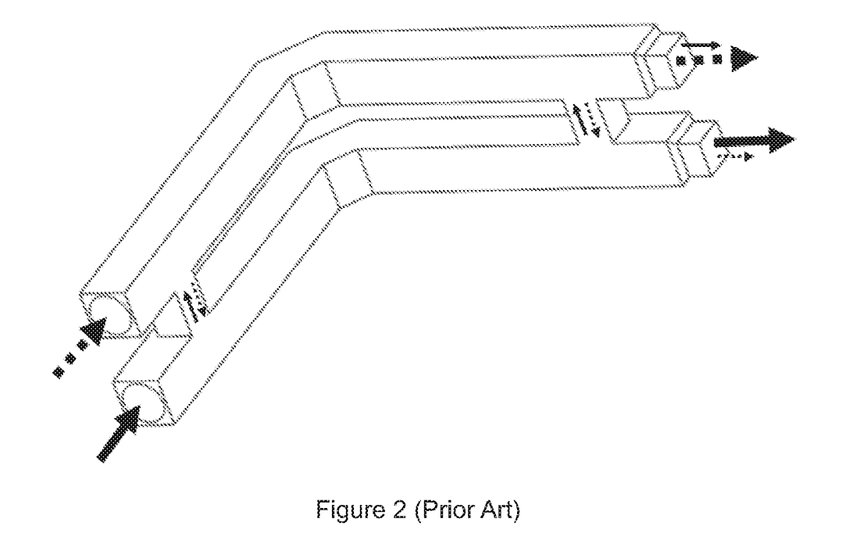
FIG. 2 is a diagram showing actual light transfer according to prior art.
Figure 3:
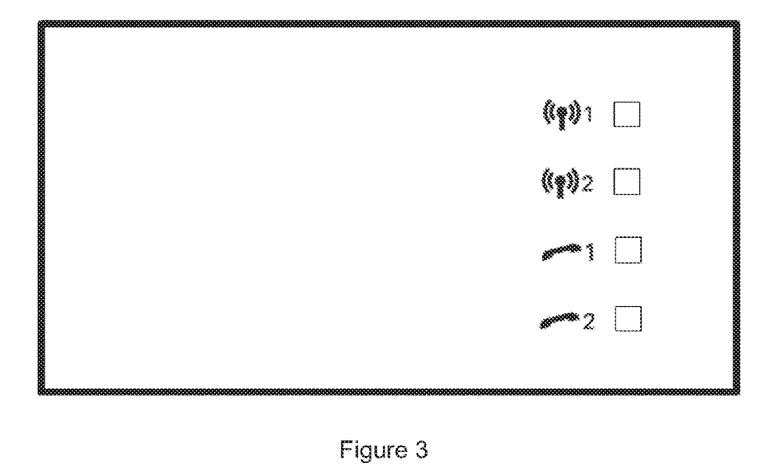
FIG. 3 is a diagram schematically showing an example of a product according to an embodiment of the present invention.

FIG. 1 is a diagram showing ideal light transfer path according to prior art. In this example, 2 light pipes and 2 connection bridges (working as a connection part) are molded with same material as a single non-detachable component for the purpose of easing assembly. A first light pipe is used for transporting a first light (or called first beam of light, or first light beam) from one end to another as indicated by solid line, i.e. from a first LED to an indicator, and a second light pipe is used for transporting a second light (or called second beam of light, or second light beam) emitted by a second LED, as indicated by dash line. The connection bridges in the shape of rectangular cuboid (right rectangular prism, rectangular parallelepiped, or orthogonal parallelepiped are also used to designate this polyhedron) are used for supporting and holding the light pipes together. In an ideal case, the first light and the second light shall be transported in their own light pipes. But in reality, light leakage and interference occurs because of the connection bridges. FIG. 2 is a diagram showing actual light transfer according to prior art. As can be seen from the FIG. 2, the first light and the second light are leaked through the connection bridges to the light pipes, in which they are not supposed to be transported. FIG. 3 is a diagram showing an example of a product, in which the light guide including light pipes and connection bridges is used to transport light from several LED emitters to the same number of front panel indicators, in order to indicate the status of the product to the user. In the ideal situation, when an event occurs or the status is changed, the corresponding indicator is illuminated. But in practical situation, because of light leakage from adjacent indicators, which shall be dark, may be illuminated with a lower level of brightness, which may result in user's misjudgment of the product status.

According to the present disclosure, it aims to minimize the light leakage and interference. This is achieved by changing physical shape of the connection bridges between light pipes.

In the example below, the light pipes and the connection bridges between the light pipes, working as physical connection parts, are made of a transparent plastic material by molding into a single non-detachable part. It brings cost reduction for manufacturing and assembling the light guiding device into an apparatus or on the circuit board. In order to achieve the objective, the shapes of the connection bridges are changed to block a light coming from a light pipe into the connection bridges by reflecting the leaking light back to the light pipe where it comes or by transmitting the light to the outside of the connection bridges. So it minimizes the amount of light passing through the connection bridge from one light pipe to another.

Figure 4:
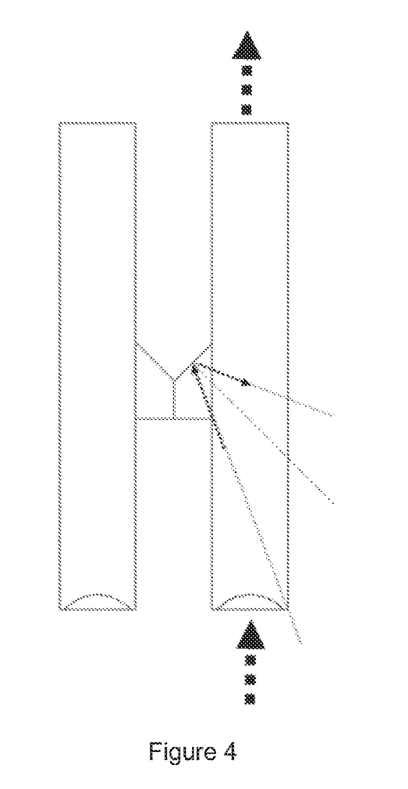
FIG. 4 is a diagram showing how a light leakage from one pipe is avoided in an example of a light guiding device according to the embodiment of the present disclosure.
Figure 5A:
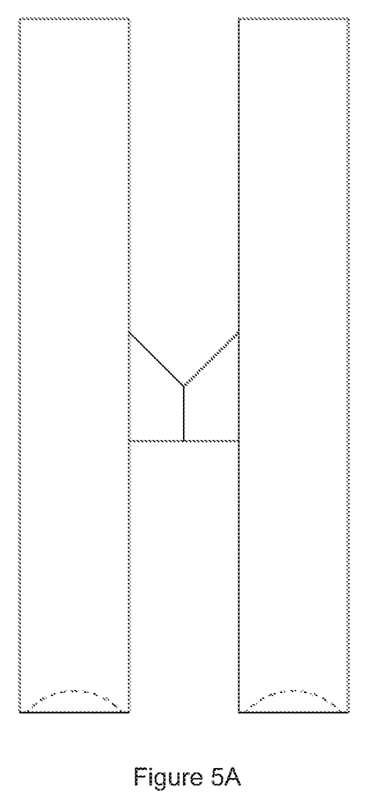
FIGS. 5A,5B and 5C are diagrams showing front view, top view and left side view of an example of a light guiding device as shown in FIG. 4 according to the embodiment of the present disclosure.
Figure 5B:
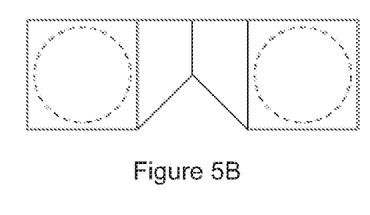
Figure 5C:
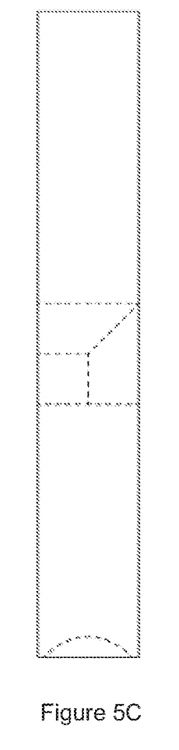

FIG. 4 is a diagram showing front view of an example according to an embodiment of the present disclosure. In the example, the light guiding device includes two straight light pipes with one connection bridge between them. As can be seen from the FIG. 4, the connection bridge does not take the shape of rectangular cuboid. Instead, the connection bridge includes two constitution parts, which are symmetric in shape. Each constitution part has a bigger rectangular base, a smaller rectangular base and four outer surfaces connecting the bigger rectangular base and the smaller rectangular base (i.e. the 4 surfaces join corresponding sides of the two bases). Among the two bases, the bigger rectangular base of a constitution part connects to the light pipe and the smaller rectangular base of the constitution part connects in overlapping to the smaller rectangular base of the other constitution part. Among the four outer surfaces, two are rectangles and the other two are trapezoids (or called trapezia). In other words, the surface whose inner (a surface of a polyhedron has an inner or inside and an outer or outside, the inner faces toward inside of the polyhedron and the outer faces toward outside of the polyhedron) faces the incident direction of light inclines inwards the larger rectangular base with an acute angle (i.e. the inclination is toward to inside of the polyhedron, and the projection of the surface whose inner facing the incident direction of light onto the plane of the larger rectangular base lies within the larger rectangular base). It shall be noted that it is just for the purpose of description in which we take the connection bridge out of the single non-detachable light guiding device and describe it by using two constitution parts. Or otherwise it is hard to describe the shape of the connection bridge. In reality, the light pipes and the connection bridge are a single component. FIGS. 5A, 5B and 5C are diagrams showing front view, top view and left side view of an example of a light guiding device according to the embodiment of the present disclosure. In this example, for each constitution part, two surfaces incline towards the larger base.

In the above examples, the shape of light pipe is rectangular cuboid. In a variant example, the shape is cylinder.

In a variant example, the connection bridge has high gloss mirror surface, i.e. all surfaces of constitution parts are high gloss mirror surfaces. In the molding of the light guiding device, if the surface of the mold is mirror polished, it will have high gloss mirror leaning surface.

In a variant example, there are two surfaces whose inners facing the incident direction of light. In other words, the planes of the two surfaces are not parallel to the incident direction of light (i.e. the geometric line of the light pipe to which the constitution part is connected), and the inners of the two surfaces face the incident direction. Then the two surfaces incline towards inside of the constitution part with acute angles. The two acute angles can be the same or different.

In a variant example, the two constitution parts are not symmetric. But the following requirements shall be followed: a) the smaller bases of the two constitution parts shall overlap; and b) one or more surfaces of the two constitution parts, which are not parallel to the geometric line of the light pipe and whose inners face the incident direction of the light, incline toward inside of the constitution parts.

In a variant example, the constitution part is a polyhedron formed by connecting a larger circle base to a small circle base, which is similar to cone but without a top smaller cone. The larger circle of a constitution part base connects to the light pipe and the smaller circle base of the constitution part connects to that of the other constitution part.

Figure 6:
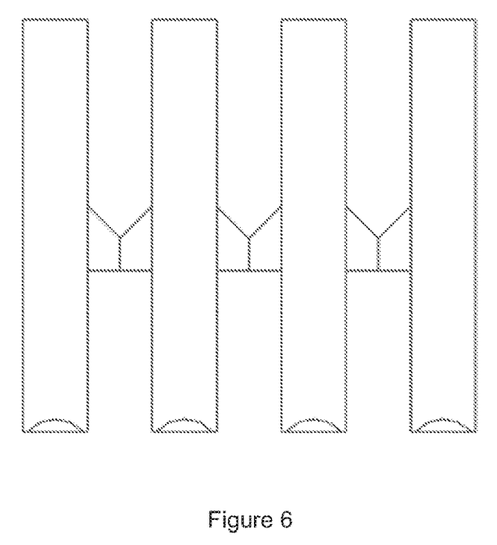
FIG. 6 is a diagram showing a light guiding device having 4 light pipes according to the embodiment of the present disclosure.

In a variant example, the number of light pipes is more than 2. Thus, a row of connection bridges is added. FIG. 6 is a diagram showing a light guiding device having 4 light pipes. It shall be noted that the number of row can be more than 1, for example, two rows of connection bridges are used.

Figure 7A:
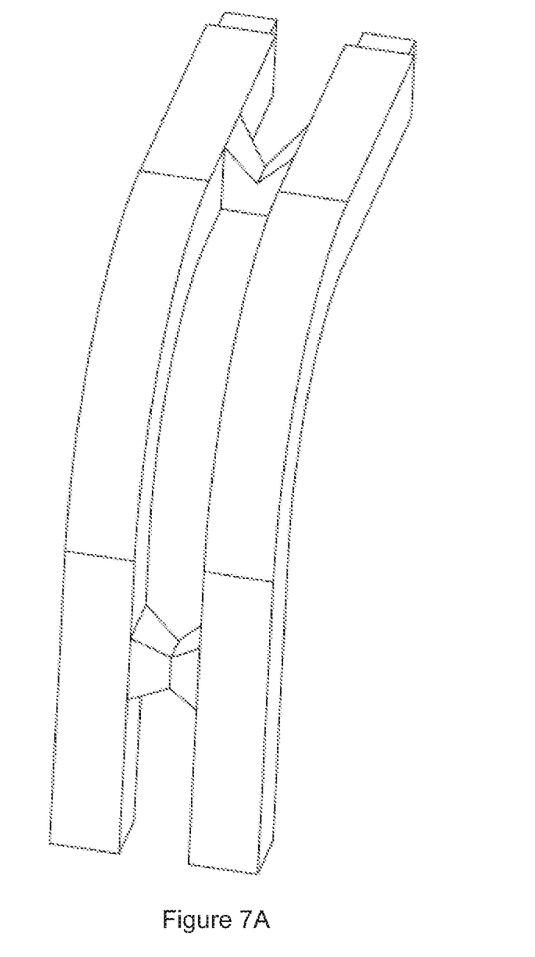
FIGS. 7A and 7B are diagrams showing a light guiding device having 2 light pipes with gentle curving bends and two rows of connection bridges according to the embodiment of the present disclosure.
Figure 7B:
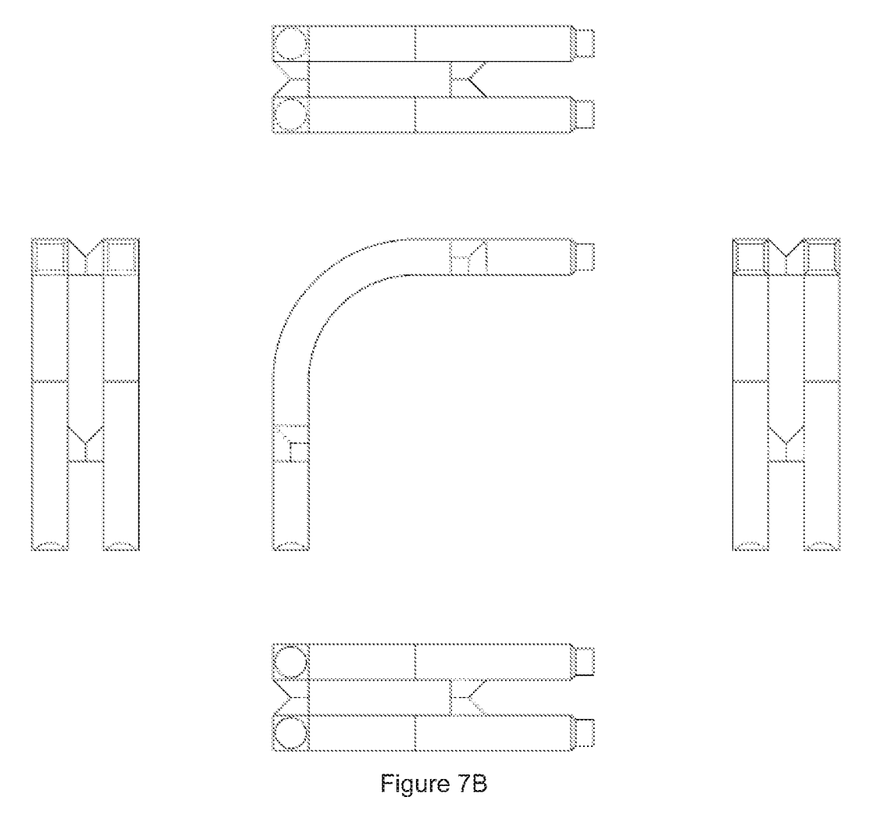
Figure 8A:
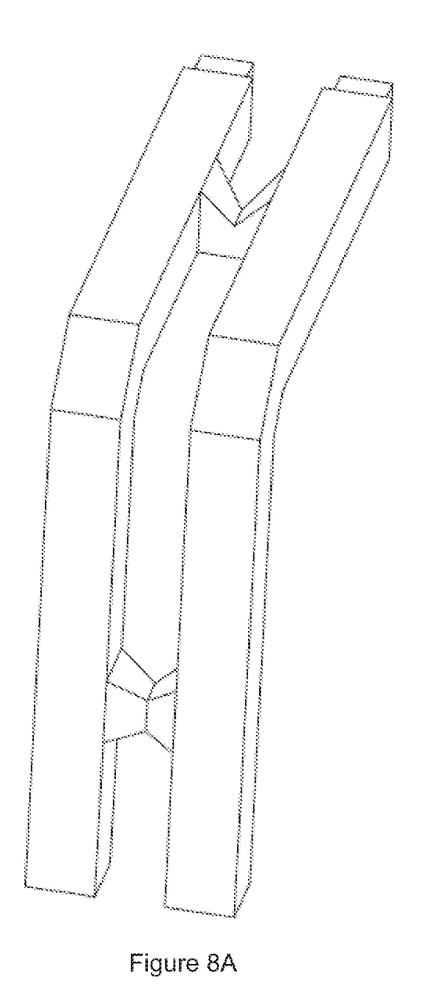
FIGS. 8A and 8B shows are diagrams showing a light guiding device having 2 light pipes with sharp prismatic folds and two rows of connection bridges according to the embodiment of the present disclosure.
Figure 8B:
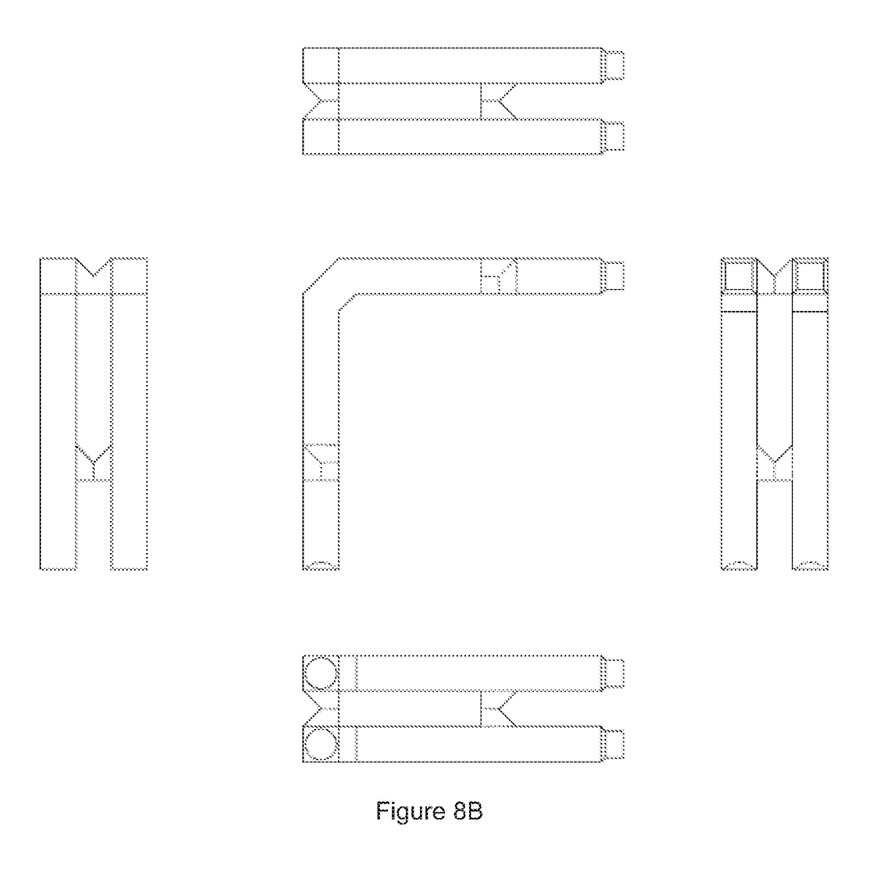

In above examples, the light pipe is straight in shape. In a variant example, the light pipe has a gentle curving bend. FIGS. 7A and 7B are diagrams showing a light guiding device having 2 light pipes with gentle curving bends and two rows of connection bridges. FIG. 7A shows a final product and FIG. 7B shows top view, left view, front view, right view and bottom view in a direction from the top to the bottom and from the left to the right. In another variant example, the light pipe has a sharp prismatic fold. FIGS. 8A and 8B are diagrams showing a light guiding device having 2 light pipes with sharp prismatic folds and two rows of connection bridges. FIG. 8A shows a final product; and FIG. 8B shows top view, left view, front view, right view and bottom view in a direction from the top to the bottom and from the left to the right.

In a variant example, the shape of the base is not rectangular, but trilateral, quadrilateral or any polygonal shape. In other words, both larger base and smaller base use a same polygonal shape but different size, and the larger base and the smaller base have same rotational orientation. And surfaces, which have a same number as that of sides of polygonal base, join the corresponding sides of the larger base and the smaller base.

In a variant example, all surfaces incline toward inside of its corresponding constitution part.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the disclosure as defined by the appended claims.

The invention claimed is:

1. A device for transporting light, comprising at least two light pipes and at least one connection part, the at least two light pipes and the at least one connection part being molded with same material as a single component,
   wherein each of the at least one connection part includes two constitution parts for connecting to two adjacent light pipes of the at least two light pipes, each of the two constitution part has a larger polygonal base, a smaller polygonal base, and at least three surfaces connecting the larger polygonal base to the smaller polygonal base,
   wherein two larger polygonal bases of the two constitution parts connect to the two adjacent light pipes; and two smaller polygonal bases of the two constitution bases connect to each other,
   wherein for each constitution part, at least one surface, whose inside faces incident direction of light within its connecting light pipe, inclines towards the larger polygonal base.

2. The device of the claim 1, wherein the two constitution parts are symmetric in shape.

3. The device of the claim 1, wherein surfaces of the at least one connection part are high gloss mirror surfaces.

4. The device of the claim 1, wherein for each constitution part, all surfaces incline towards the larger polygonal base.

5. The device of the claim 1, wherein number of the at least one connection part is more than two, and the at least one connection part forms two rows of connection parts.

6. The device of the claim 1, wherein the larger polygonal base and the smaller polygonal base are rectangles in shape.

7. The device of the claim 1, wherein the at least two light pipes have a gentle curving bend.

8. The device of the claim 1, wherein the at least two light pipes have a sharp prismatic fold.

9. An electronic device, wherein the electronic device has a light source, and light transporting device and an indicator panel, the light transporting device transports light from the light source to the indicator panel, wherein the light transport device has a structure as claimed in claim 1.

* * * * *